(12) United States Patent  
Mochizuki

(10) Patent No.: US 8,810,841 B2  
(45) Date of Patent: Aug. 19, 2014

(54) PRINT DATA PROCESSING SYSTEM

(75) Inventor: Mamoru Mochizuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 126 days.

(21) Appl. No.: 13/557,684

(22) Filed: Jul. 25, 2012

(65) Prior Publication Data

US 2013/0070294 A1    Mar. 21, 2013

(30) Foreign Application Priority Data

Sep. 15, 2011    (JP) ................................. 2011-201546

(51) Int. Cl.
*G06F 3/12* (2006.01)
*G06K 15/02* (2006.01)

(52) U.S. Cl.
CPC ......... *G06K 15/1857* (2013.01); *Y02B 60/1271* (2013.01); *G06F 3/1221* (2013.01); *G06F 3/124* (2013.01); *G06F 3/1285* (2013.01); *G06F 3/1211* (2013.01)
USPC ............................ 358/1.15; 358/1.9; 358/504

(58) Field of Classification Search
USPC .......................................... 358/1.15, 1.9, 504
See application file for complete search history.

(56) References Cited

U.S. PATENT DOCUMENTS

2009/0251723 A1 * 10/2009 Igarashi ....................... 358/1.15
2009/0251732 A1   10/2009 Igarashi

FOREIGN PATENT DOCUMENTS

| JP | A-2001-282494 | 10/2001 |
| JP | A-2005-92444 | 4/2005 |
| JP | A-2006-239968 | 9/2006 |
| JP | A-2007-310450 | 11/2007 |
| JP | A-2009-268082 | 11/2009 |
| JP | A-2011-166564 | 8/2011 |

OTHER PUBLICATIONS

English Translation of Office Action issued in Japanese Patent Application No. 2011-201546 dated Dec. 6, 2011.

* cited by examiner

*Primary Examiner* — Jacky X Zheng
(74) *Attorney, Agent, or Firm* — Oliff PLC

(57) ABSTRACT

A print data processing system includes plural main interpretation devices that interpret print data described in a page description language and generate print image data to be supplied to a printer, auxiliary interpretation devices that interpret the print data, generate print image data to be supplied to the printer, and are not powered on when the plural main interpretation devices are powered on, and an allocation device that divides the print data in prescribed units and allocates interpretation processing of divided print data of the respective units to the plural main interpretation devices, wherein the allocation device includes a load evaluation unit that evaluates the loads of the plural main interpretation devices, and a power-on unit that, when the loads of the plural main interpretation devices evaluated by the load evaluation unit exceed a prescribed on threshold value for activating the auxiliary interpretation devices, powers on the auxiliary interpretation devices.

3 Claims, 14 Drawing Sheets

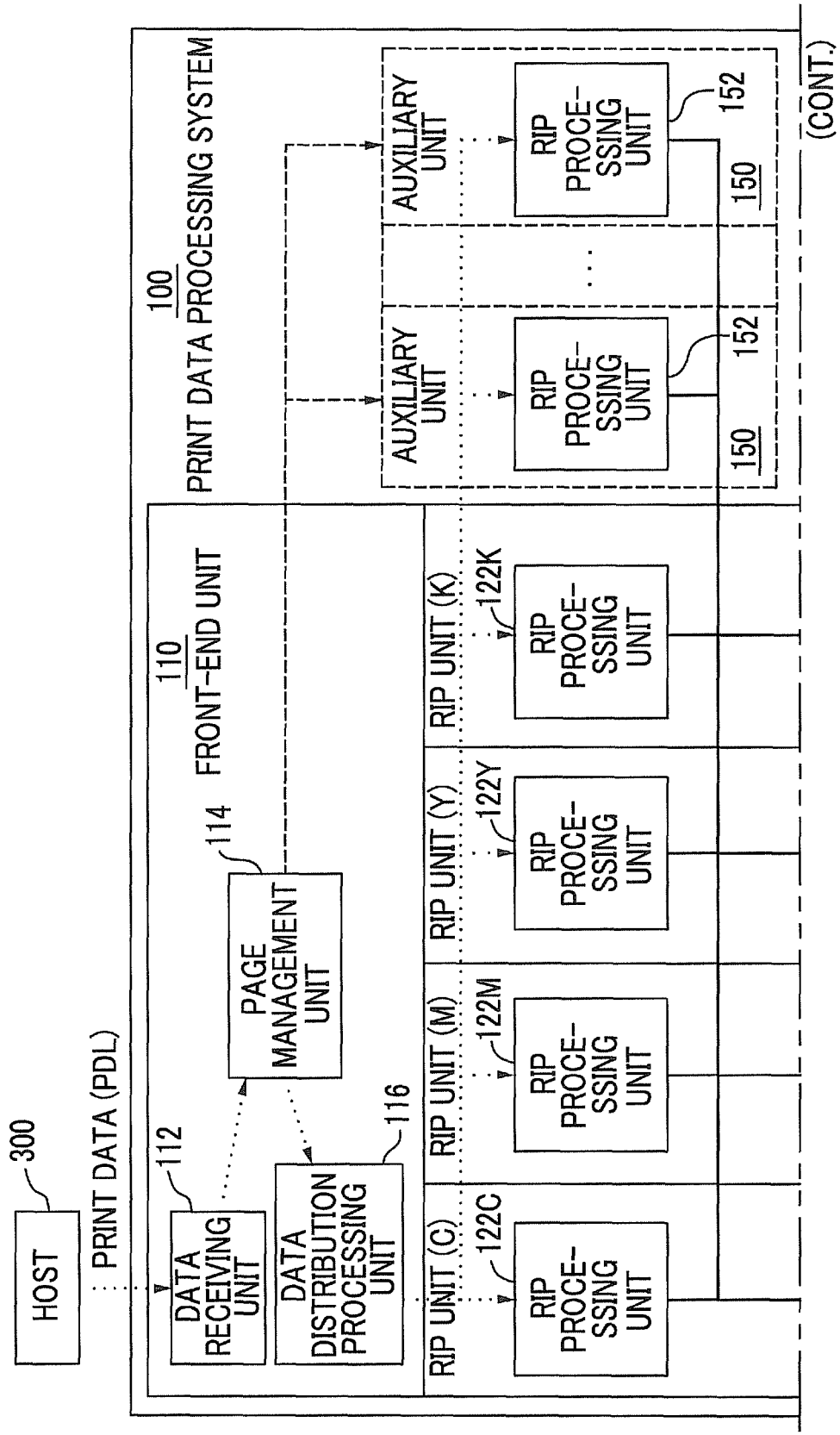

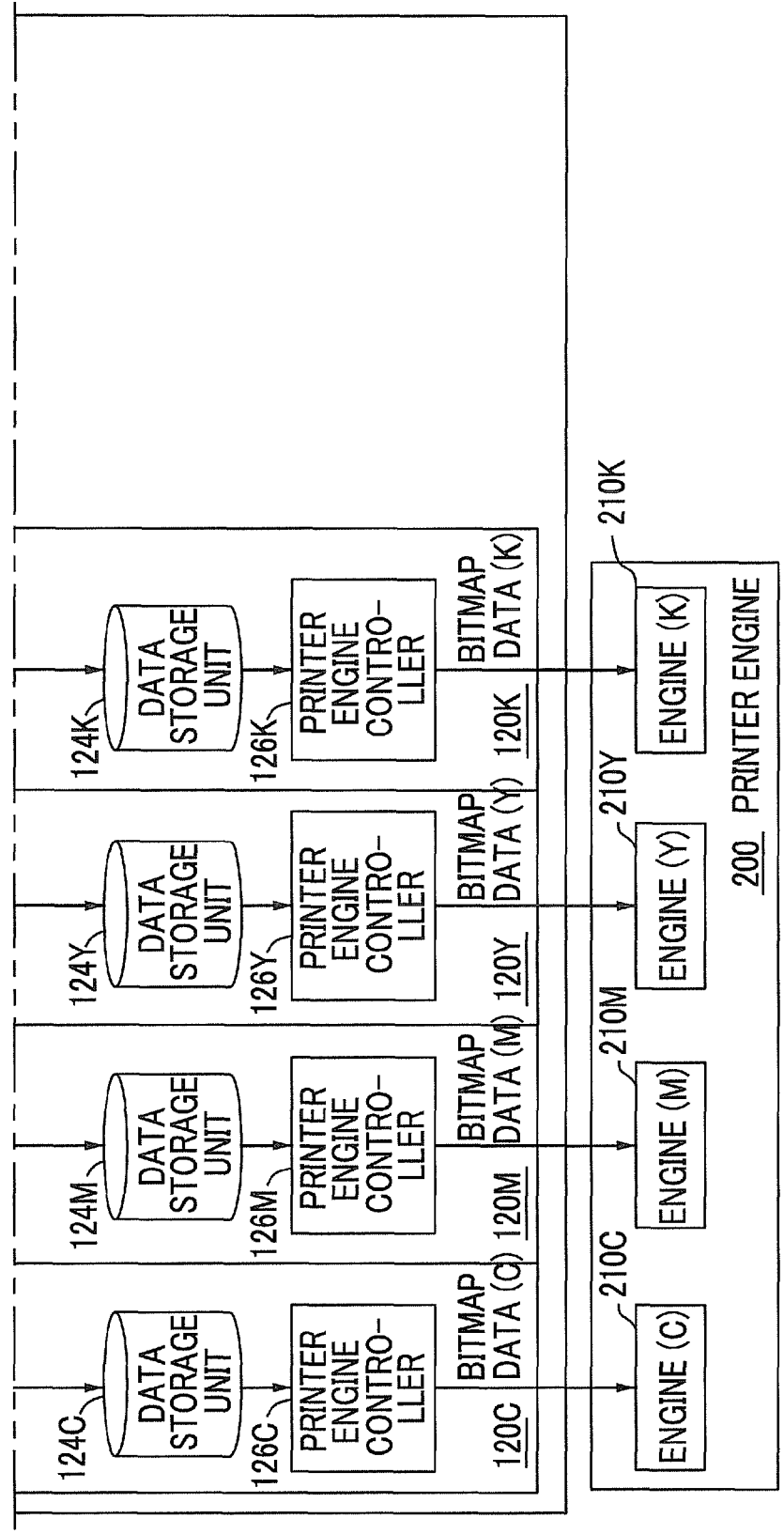

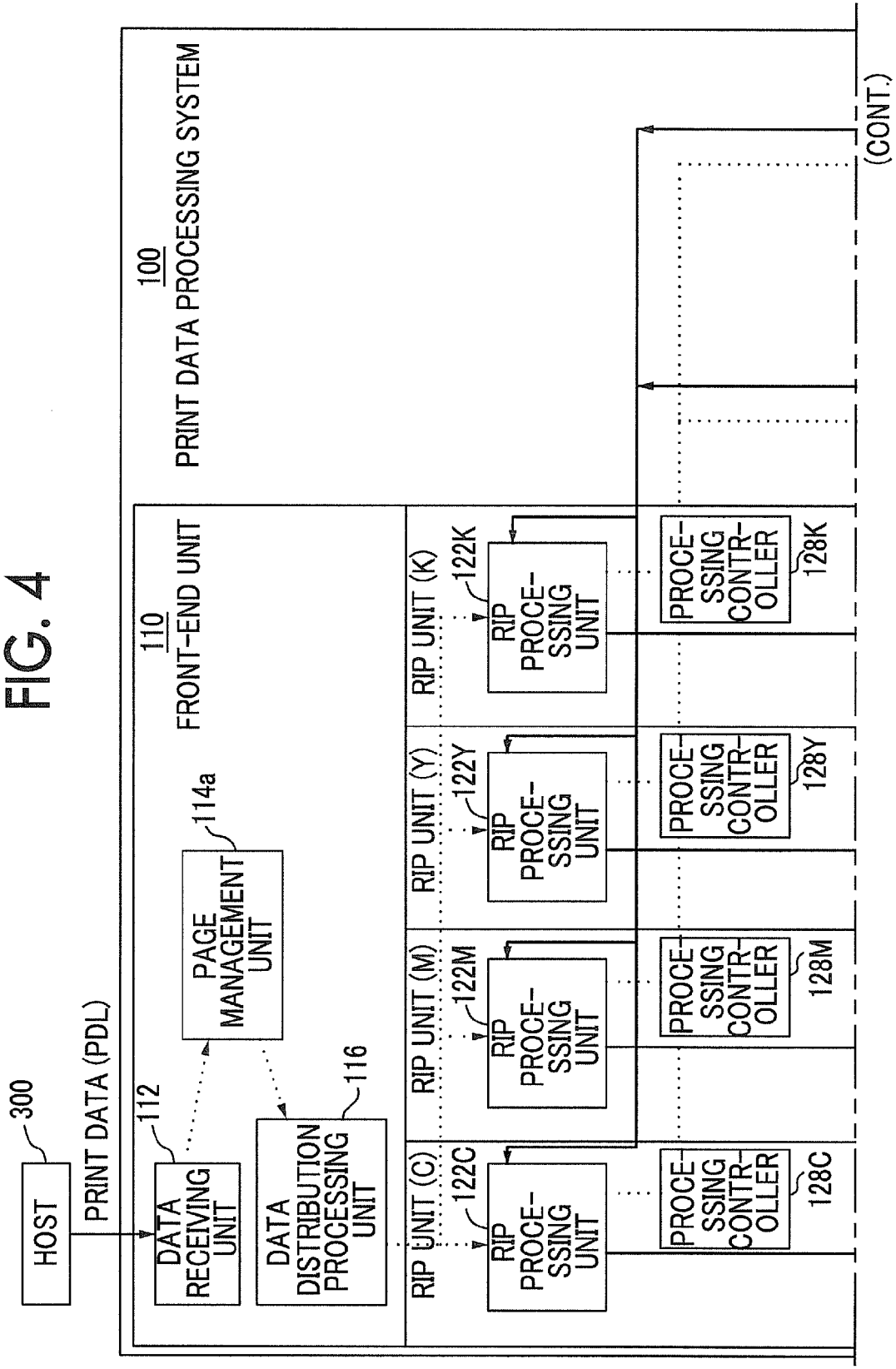

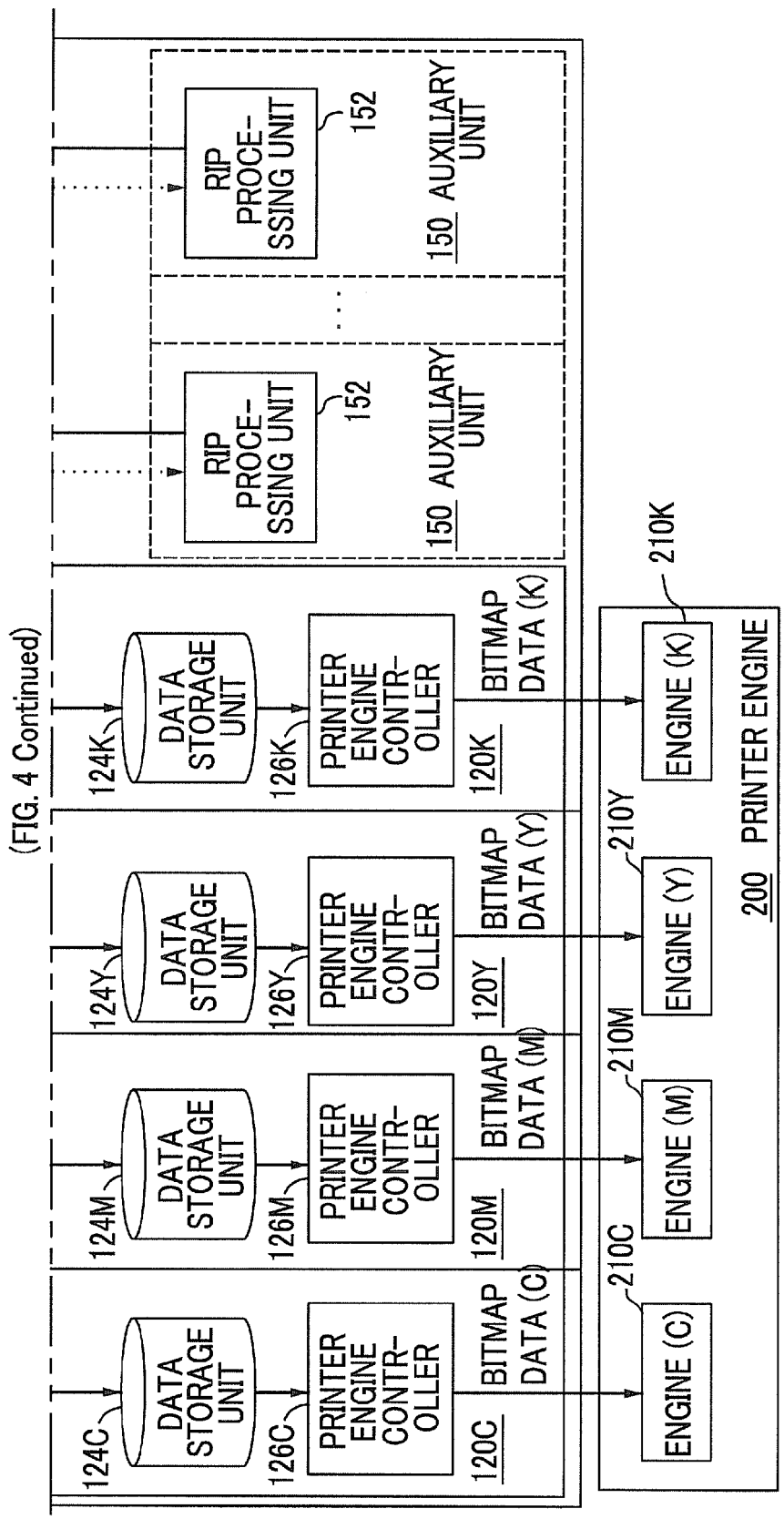

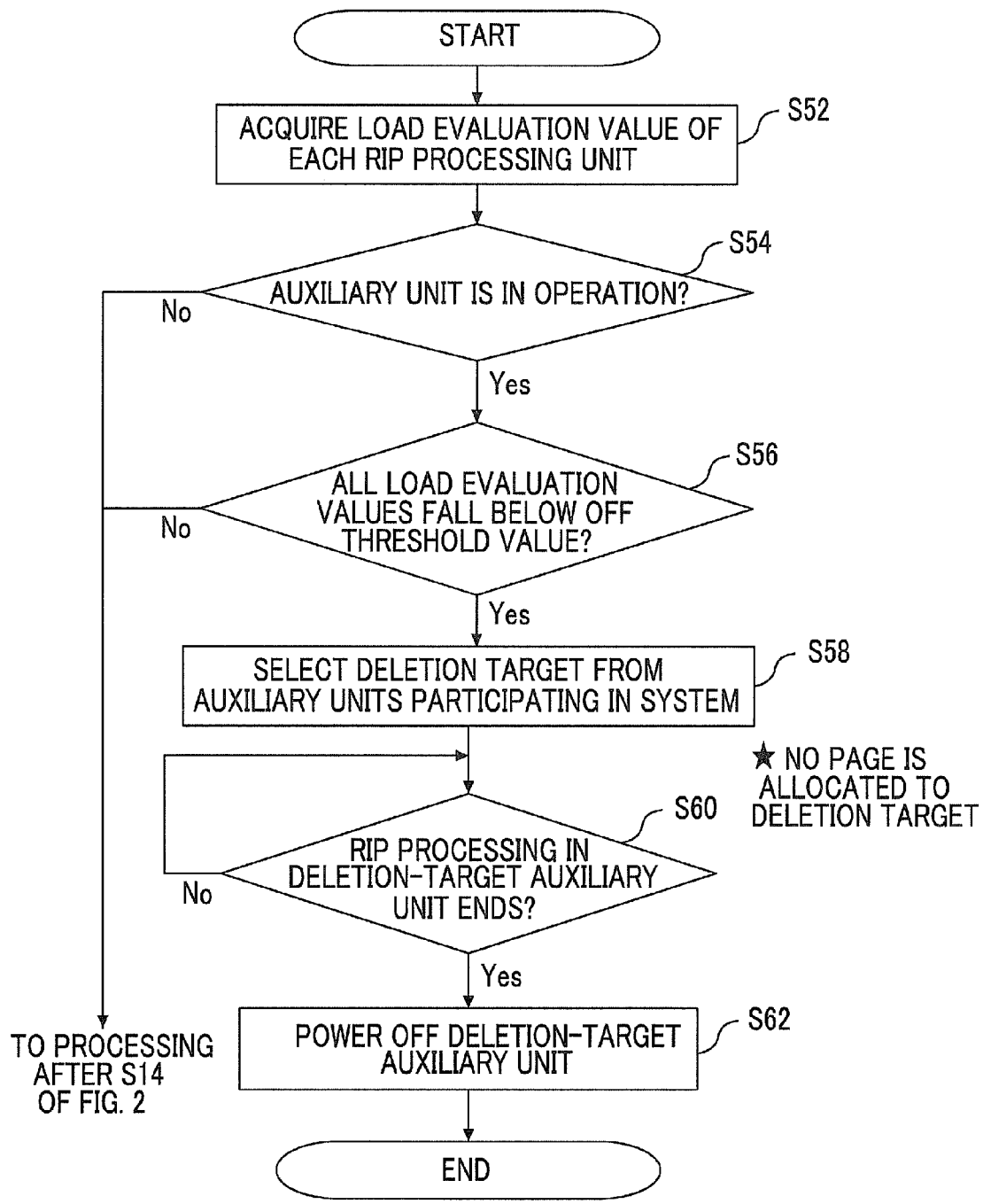

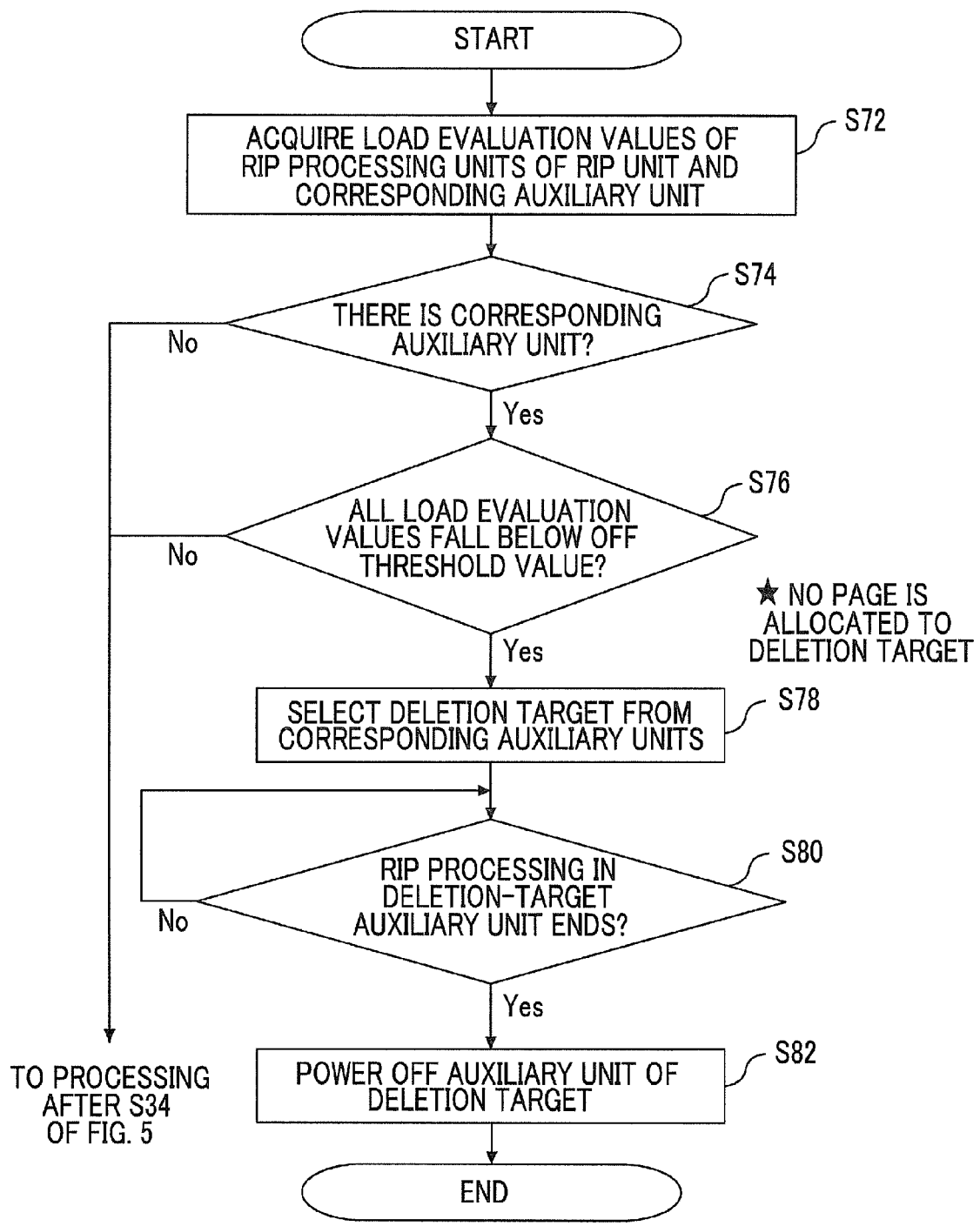

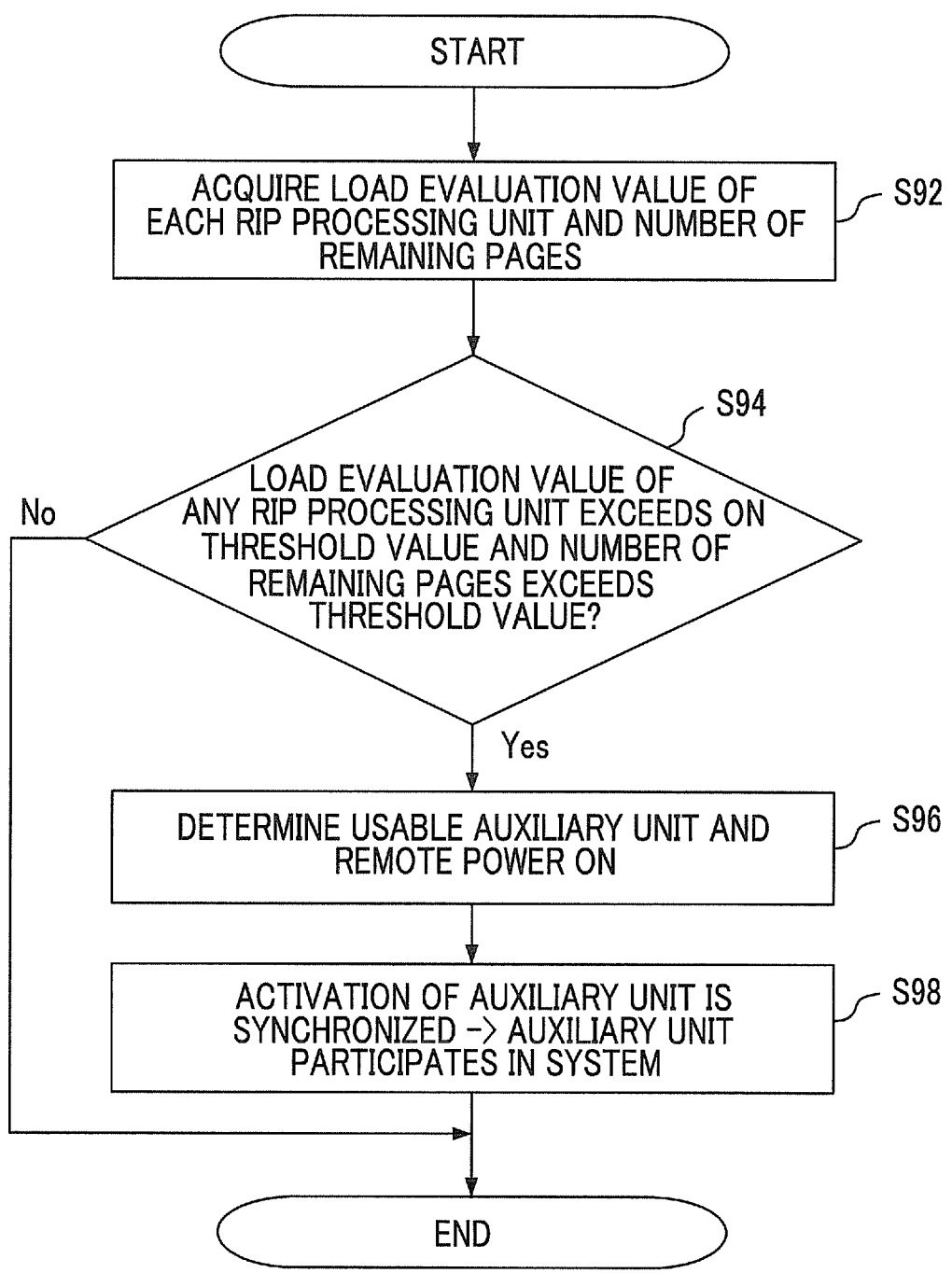

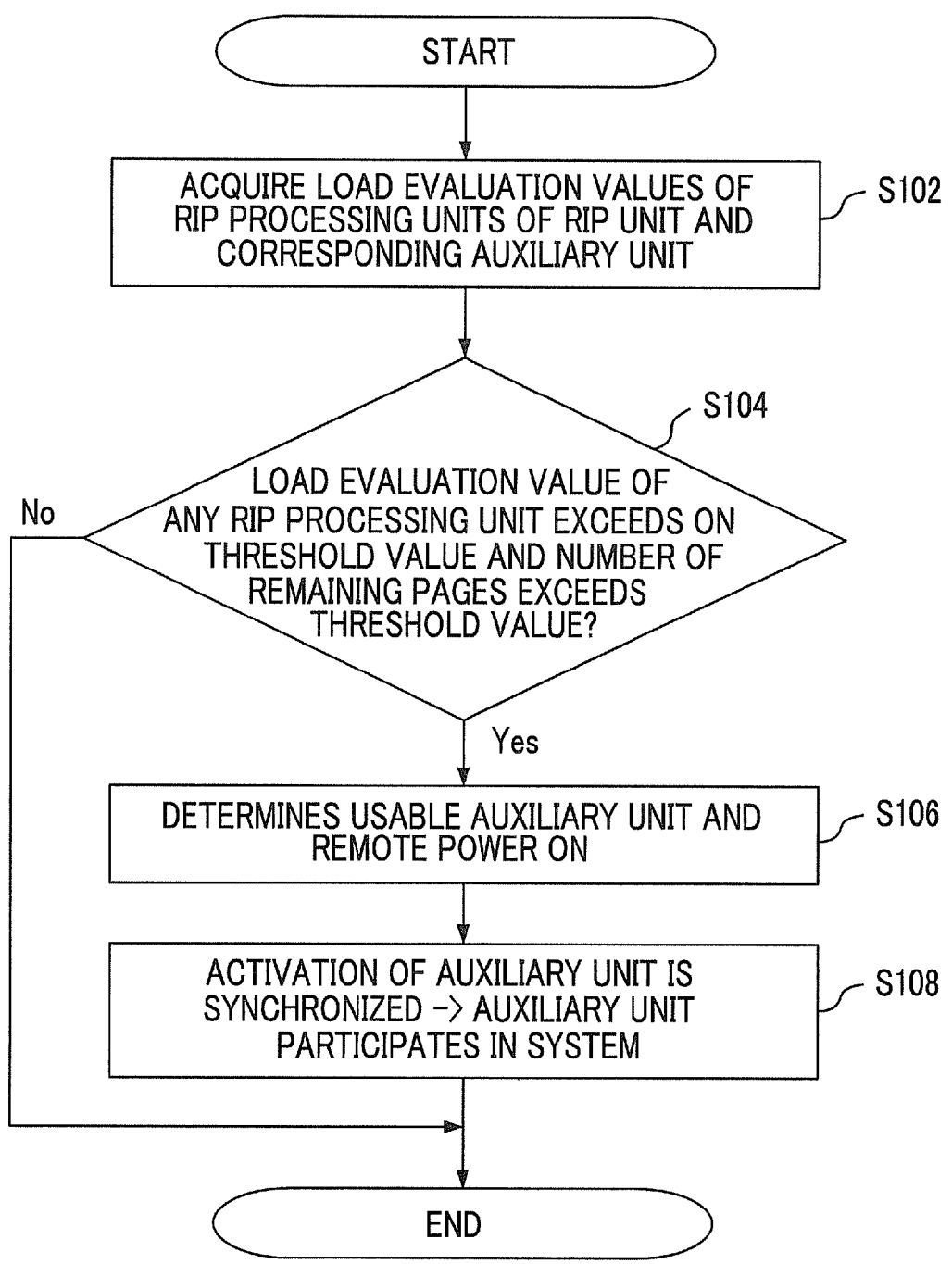

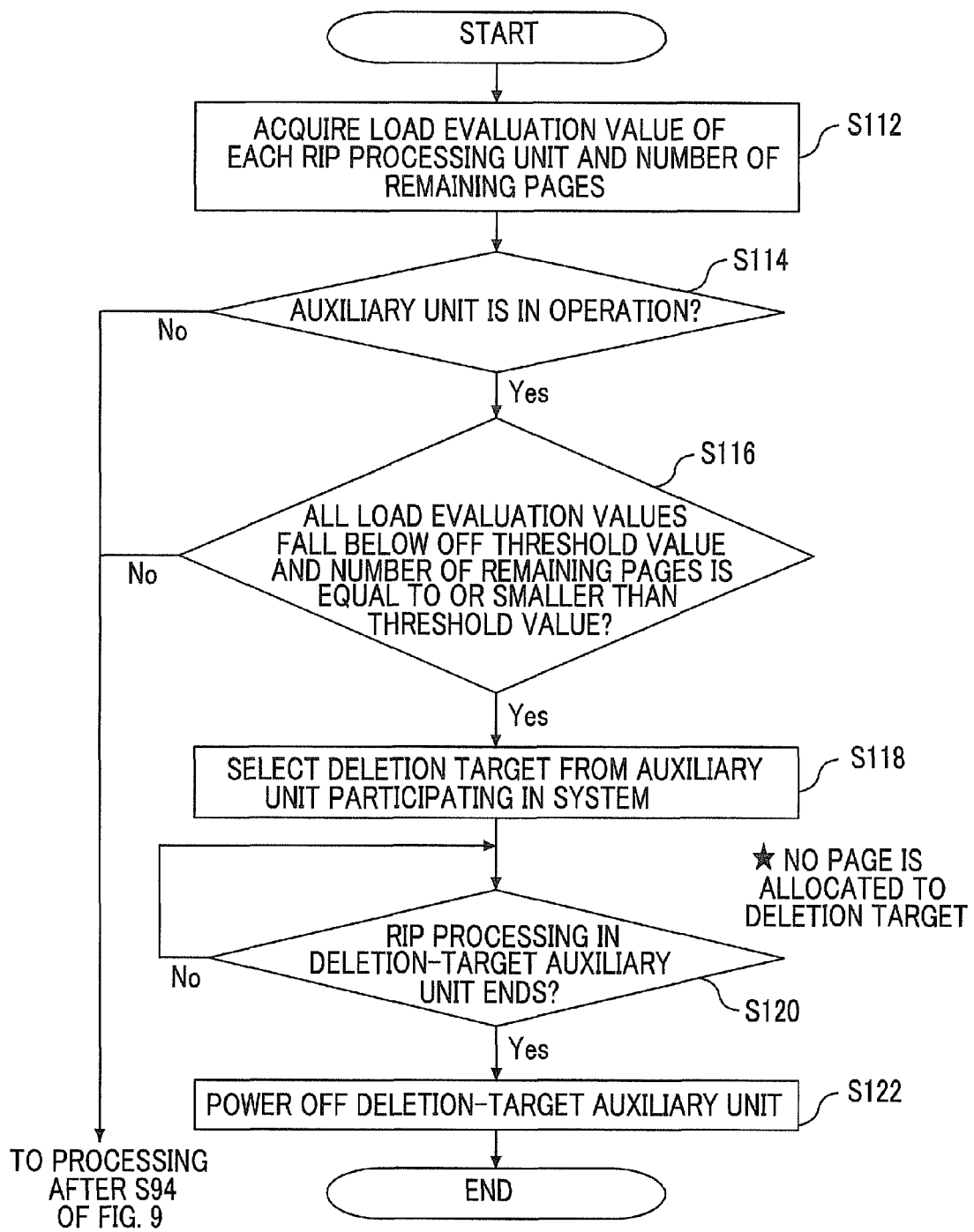

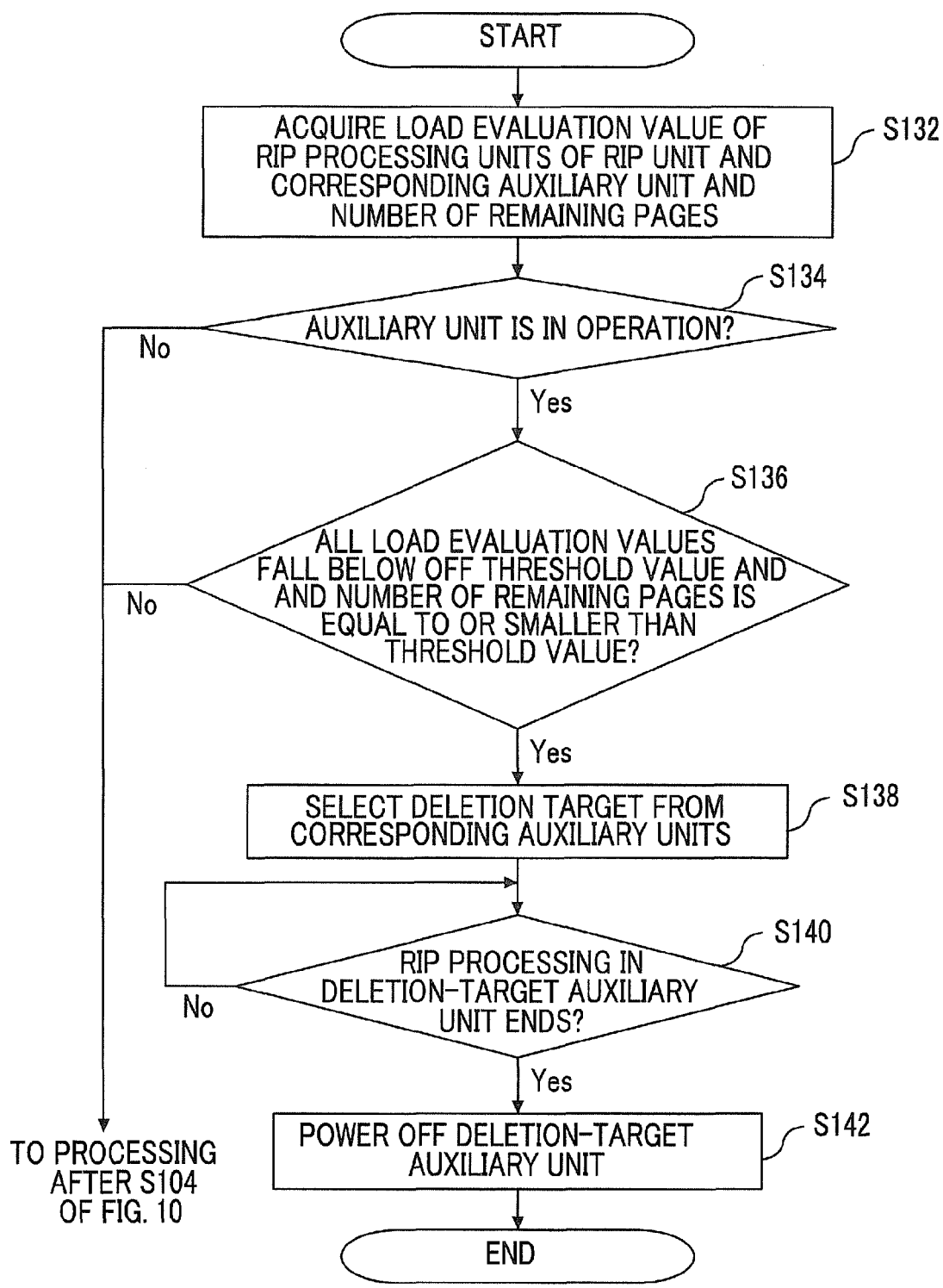

PRINT DATA PROCESSING SYSTEM

CROSS-REFERENCE TO RELATED APPLICATIONS

This application is based on and claims priority under 35 USC 119 from Japanese Patent Application No. 2011-201546 filed Sep. 15, 2011.

BACKGROUND (i) Technical Field

The present invention relates to a print data processing system.

(ii) Related Art

Plural RIP (Raster Image Processor) devices which interpret print data described in a page description language to generate raster image data are provided, and print data of different pages are processed in parallel using the plural RIP devices, thereby achieving high-speed RIP processing.

In a system in which plural RIP devices are operated in parallel, in general, as the number of RIP devices increases, the RIP processing can increase in speed. For this reason, one or more auxiliary RIP devices are provided in the system in addition to one or more normal RIP devices, and when processing print data with a high processing load, the auxiliary RIP devices are also operated in addition to the normal RIP devices. In an example of the system of the related art, when the auxiliary RIP devices are used, an operator who operates the system powers on the auxiliary RIP devices as well as the normal RIP devices at the time of system activation, and the system is configured such that the auxiliary RIP devices are also activated at the time of activation. An example where the operation of the system is paused, the operator powers on an auxiliary RIP device which is not activated, and carries out an operation to compel the auxiliary RIP device to participate in the system using a user interface for system construction is also known.

SUMMARY

A print data processing system according to an aspect of the invention includes plural main interpretation devices that interpret print data described in a page description language and generate print image data to be supplied to a printer, auxiliary interpretation devices that interpret the print data, generate print image data to be supplied to the printer, and are not powered on when the plural main interpretation devices are powered on, and an allocation device that divides the print data in prescribed units and allocates interpretation processing of divided print data of the respective units to the plural main interpretation devices, wherein the allocation device includes a load evaluation unit that evaluates the loads of the plural main interpretation devices, and a power-on unit that, when the loads of the plural main interpretation devices evaluated by the load evaluation unit exceed a prescribed on threshold value for activating the auxiliary interpretation devices, powers on the auxiliary interpretation devices, and processing of divided print data of the respective units is allocated to the auxiliary interpretation devices after power-on.

BRIEF DESCRIPTION OF THE DRAWINGS

Exemplary embodiments of the present invention will be described in detail based on the following figures, wherein:

FIG. 1 is a diagram showing an example of a system configuration when power-on of an auxiliary unit is controlled in a front-end unit;

FIG. 4 is a diagram showing an example of a system configuration when power-on of an auxiliary unit is controlled in each RIP unit;

FIG. 7 is a diagram showing an example of a procedure of control for power-off of an auxiliary unit in the example of FIG. 1;

FIG. 8 is a diagram showing an example of a procedure of control for power-off of an auxiliary unit in the example of FIG. 4;

FIG. 9 is a diagram showing another example of a procedure of control for power-on of an auxiliary unit in the example of FIG. 1;

FIG. 10 is a diagram showing another example of a procedure of control for power-on of an auxiliary unit in the example of FIG. 4;

FIG. 11 is a diagram showing another example of a procedure of control for power-off of an auxiliary unit in the example of FIG. 1; and FIG. 12 is a diagram showing another example of a procedure of control for power-off of an auxiliary unit in the example of FIG. 4.

DETAILED DESCRIPTION

Figure 2:
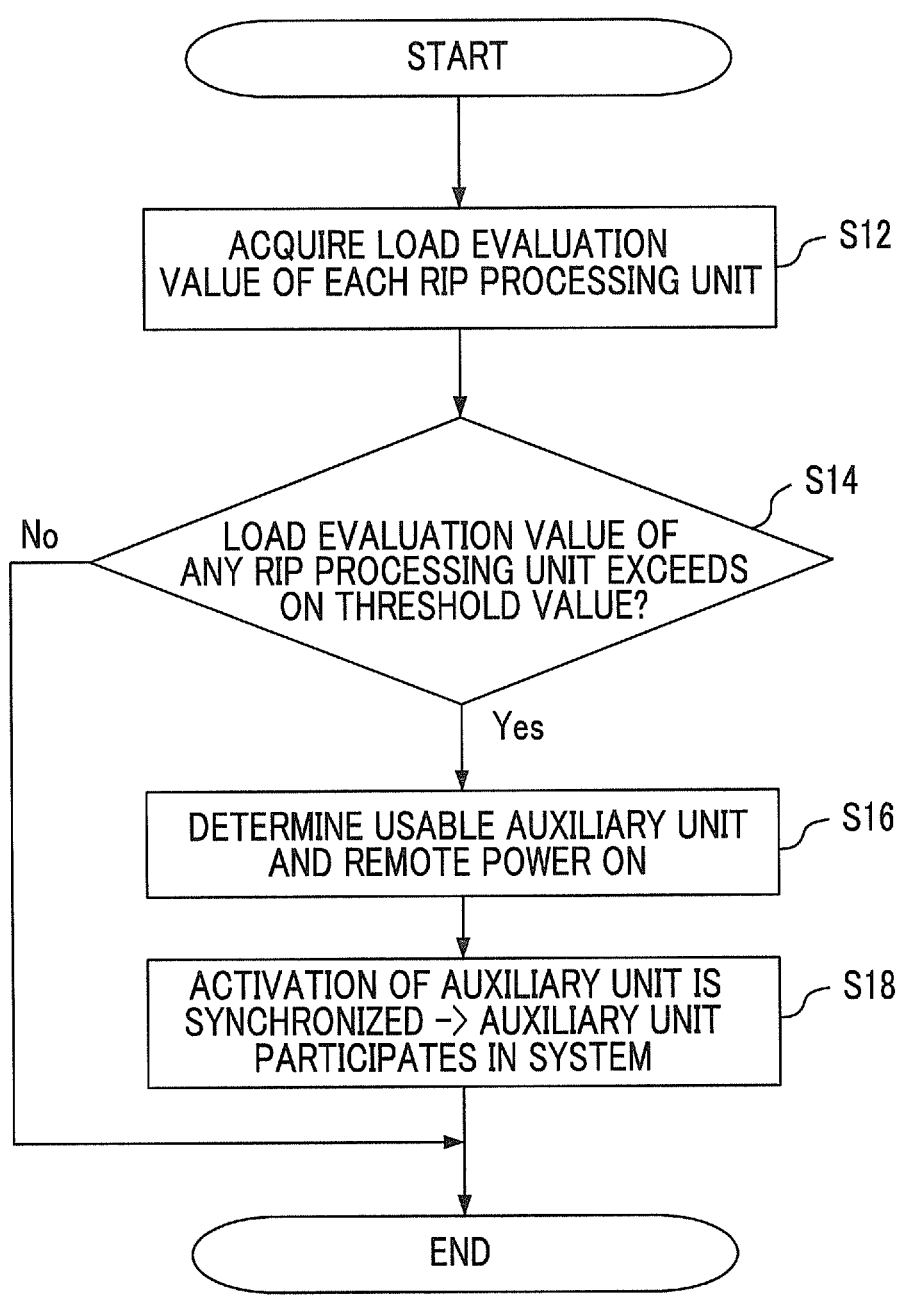
FIG. 2 is a diagram showing an example of a procedure of control for power-on of an auxiliary unit in the example of FIG. 1.

A first example of a print data processing system 100 of an exemplary embodiment will be described with reference to FIG. 1.

The print data processing system 100 receives print data described in a page description language (hereinafter, referred to as PDL. PDL is an abbreviation of Page Description Language) from a host 300, such as a personal computer or a workstation, processes the print data to generate bitmap data (or raster data), and supplies the generated bitmap data to a printer engine 200 for printing on a sheet. The printer engine 200 prints an image corresponding to the bitmap data on the sheet using color materials (ink, toner, or the like) of primary colors of C (cyan), M (magenta), Y (yellow), and K (black).

The print data processing system 100 has a front-end unit 110, RIP units 120C, 120M, 120Y, and 120K provided to correspond to respective colors of CMYK, and one or more auxiliary units 150. In a system which uses a color material of a special color other than the process colors, a RIP unit for the special color may be further provided.

In FIG. 1, a dotted-line arrow indicates the flow of print data described in the PDL, and a solid-line arrow indicates the flow of bitmap image data generated by interpreting print data.

The front-end unit 110 is a unit which divides print data received from the host 300 and allocates divided print data to RIP processing units 122C to 122K, and 152. The front-end unit 110 has a data receiving unit 112, a page management unit 114, and a data distribution processing unit 116.

The data receiving unit 112 receives print data generated by the host 300.

The page management unit 114 performs management for dividing print data received by the data receiving unit 112 in prescribed units and allocating the respective units of the division result to the RIP processing units 122C to 122K, and 152. The division unit is typically, but not limited to, "page". For example, the division unit may be a prescribed number of pages. Hereinafter, description will be provided as to an example where print data is divided in pages.

When print data is described in a page-independent PDL, such as a PDF (Portable Document Format), the page management unit 114 may divide print data itself in pages and may allocate page PDL data to the RIP processing units 122C to 122K, and 152. The term "page-independent" means that data representing an image of an individual page is entirely included in PDL data of the page, and data of other pages is not needed.

In case of "page-dependent", such as PostScript (Registered Trademark), since a state designated by a PDL command of a previous page is succeeded by a subsequent page, an image of a correct page is not obtained by drawing an image based on interpretation of page print data. Accordingly, when print data is described in a page-dependent PDL, the page management unit 114 performs only the allocation of an assigned page to the RIP processing units 122C to 122K, and 152. In this case, the whole undivided print data is delivered to the RIP processing units 122C to 122K, and 152, interpretation is only performed sequentially from the head of the print data, and in regard to an assigned page, a bitmap image is actually drawn on a page memory using the interpretation result. In case of page-dependent print data, the "division" of print data in pages by the page management unit 114 refers to the division regarding allocation of RIP processing absolutely, and print data is not actually divided. In case of the PDF, similarly to PostScript, a method in which the whole print data is delivered, and each RIP processes a designated page may be used.

In regard to how the page management unit 114 allocates pages to the RIP processing units 122C to 122K, and 152, for example, any of various allocation methods of the related art may be used, and the allocation method is not particularly limited. For example, a method in which pages are sequentially allocated in order of pages may be used. In an example described below, a method in which a page is allocated to a RIP processing unit with the lowest load while monitoring the load of each of the RIP processing unit 122C to 122K, and 152 is used. As described below, each auxiliary unit 150 is not activated (that is, not powered on) when the print data processing system 100 is activated. For this reason, a page is allocated to the RIP processing unit 152 of each auxiliary unit 150 after a state where the auxiliary unit 150 is powered on, activation processing is completed, and the auxiliary unit 150 participates in the print data processing system 100 (that is, a state where print data can be received, RIP processing may be performed, and the processing result may be output) is reached.

The page management unit 114 may record which page is allocated to each of the RIP processing units 122C to 122K, and 152.

The page management unit 114 monitors the load state of each of the RIP processing units 122C to 122K, and when the load of the RIP processing unit 122 is excess, activates the auxiliary units 150. The activation control of the auxiliary units 150 will be described below in detail.

The data distribution processing unit 116 distributes data to the RIP processing units 122C to 122K, and 152 in accordance with page allocation to the RIP processing units 122C to 122K, and 152 determined by the page management unit 114. That is, when processing page-independent print data, the data distribution processing unit 116 divides the print data in pages, and distributes page PDL data to the RIP processing units 122C to 122K, and 152. In case of page-dependent print data, the data distribution processing unit 116 distributes the print data to the RIP processing units 122C to 122K, and 152, and also distributes information for specifying an allocated page determined by the page management unit 114 to the RIP processing units 122C to 122K, and 152.

The RIP units 120C, 120M, 120Y, and 120K for the respective colors of C, M, Y, and K are units which interpret print data to generate a bitmap image (also referred to as a raster image) of the allocated page. The RIP units 120C, 120M, 120Y, and 120K are different in a color version of a bitmap image to be output, and have the same internal components or the same processing content of each component. When distinction is not necessary, the RIP units 120C, 120M, 120Y, and 120K are collectively referred to as the RIP units 120, and when distinction is not necessary, similarly, the internal components, such as the RIP processing units 122C, 122M, 122Y, and 122K, are collectively referred to in a form in which C to M at the end of reference numerals are omitted.

Each RIP unit 120 includes a RIP processing unit 122, a data storage unit 124, and a printer engine controller 126.

The RIP processing unit 122 performs RIP processing on print data. The RIP processing is processing for interpreting print data described in the PDL and generating a bitmap image in accordance with the interpretation result. The RIP processing unit 122 interprets print data to generate a bitmap image of a page allocated from the front-end unit 110. When print data represents a full color image, the RIP processing units 122 of the RIP units 120 for respective colors generate bitmap images of all color versions of C, M, Y, and K from the print data. It is not as if the RIP processing unit 122C of the C RIP unit 120C generates only a C bitmap image.

Each RIP processing unit 122 stores the generated bitmap image of each color version in the data storage unit 124 of the RIP unit 120 for the corresponding color. For example, the RIP processing unit 122C of the C RIP unit 120C stores a C bitmap image generated by the RIP processing in the data storage unit 124C, stores an M bitmap image in the data storage unit 124M, stores a Y bitmap image in the data storage unit 124Y, and stores a K bitmap image in the data storage unit 124K. Accordingly, the C bitmap images of each page generated by the RIP processing units 122 of the RIP units 120 for the respective colors are stored in the data storage unit 124C of the C RIP unit 120C.

The data storage unit 124 is a buffer which absorbs the difference in processing speed between the group of RIP processing units 122 on the upstream side and the printer engine controller 126 and an engine 210 on the downstream side. As described above, the bitmap images of each color of each page from the RIP processing units 122C to 122K are input to and stored in the data storage unit 124 of the RIP unit 120 for the color in association with the page number.

The printer engine controller 126 of each color version reads the bitmap images of the color version of the respective pages buffered in the upstream-side data storage unit 124 in order of pages, and supplies the bitmap images to the engine 210 for the corresponding color in the printer engine 200. That is, for example, the engine 210 sends a completion signal to the corresponding printer engine controller 126 each time printing of the bitmap image being currently processed on a sheet is completed, and the printer engine controller 126 transfers the bitmap image of the next page to the engine 210 in accordance with the completion signal. After a notification of printing completion of the previous page is received from the engine, the next page may be transferred or pages may be delayed by the amount which may be held on the engine side. For example, when there is no bitmap image of a page to be next transferred to the engine 210 in the corresponding data storage unit 124, the printer engine controller 126 waits until the bitmap images of the page are generated and put in the data storage unit 124, and supplies the bitmap images of the page to the engine 210 after the bitmap images are put. With this operation, each engine 210 prints the bitmap images of the corresponding color version on the sheet.

In this way, the engine 210 for each color is connected to the RIP unit 120 for the corresponding color, for example, through a communication cable.

The printer engine 200 is a device which prints the bitmap images generated by the print data processing system 100 on a sheet using color materials, such as ink. The printer engine 200 has the engines 210C to 210K for the respective color versions. When a color material of a special color other than the process colors is used, an engine for the special color may be provided. The engine 210 for each color version forms an image on a sheet using the color material of the color version in accordance with bitmap image data of the color version. In the printer engine 200, for example, the engines 210C to 210K are arranged in a tandem manner, and the engines 210C to 210K sequentially print the bitmap images of the respective color versions at the same position on the sheet in an overlap manner, such that a full color image is printed.

The printer engine 200 may be for continuous paper or for cut paper. A post-processing unit which performs post-processing on the printed sheet may be connected at the rear of the printer engine 200. As the post-processing which is performed by the post-processing unit, there are various kinds of processing, such as cutting of continuous paper, folding, binding, and enclosure in an envelope.

The print data processing system 100 includes one or more auxiliary units 150. When the processing capability of the RIP processing unit 122 in the RIP unit 120 for each color as a main unit is lacking, these auxiliary units 150 are units which assist the RIP processing. Each auxiliary unit 150 includes a RIP processing unit 152, but neither data storage unit 124 nor printer engine controller 126 is provided. The RIP processing unit 152 of the auxiliary unit 150 has the same function as the RIP processing unit 122. That is, the RIP processing unit 152 interprets print data to generate bitmap image of each color version of a page allocated from the front-end unit 110, and transfers the generated bitmap image of each color version to the data storage unit 124 of the RIP unit 120 for the corresponding color version.

Each auxiliary unit 150 is not yet powered on when the print data processing system 100 is activated. If the processing capability of each RIP processing unit 122 as a main unit is lacking (or is predicted to be lacking), first, the auxiliary unit 150 is powered on. The situation in which the processing capability of each RIP processing unit 122 is lacking refers to a situation in which the load of the RIP processing unit 122 increases, and the generation speed of the bitmap image is slower than the printing speed of the printer engine 200. In this exemplary embodiment, in this situation or when this situation is predicted, the auxiliary unit 150 is activated to perform the RIP processing, such that the RIP speed as the whole of the system increases, thereby effectively using the printing speed of the printer engine 200.

If the auxiliary unit 150 is powered on, and the activation processing and the processing for synchronization of each RIP unit 120 in operation are completed, the auxiliary unit 150 participates in the print data processing system 100, is allocated with a page from the front-end unit 110, and performs the RIP processing.

In the system configuration shown in FIG. 1, the RIP unit 120 for each color version and each auxiliary unit 150 are constituted by, for example, an individual computer having a CPU, a memory, and the like. An individual computer may be constituted as an independent device of a separate housing or may be constituted as a separated board (substrate) which is accommodated in the same housing. The front-end unit 110 may be mounted as a computer separated from these RIP unit or may be mounted on a computer on which one of the RIP units 120 for the respective color versions is mounted (that is, a program of the front-end unit 110 is executed on this computer). These computers are connected to, for example, a common data communication network, and exchange print data or bitmap image data through the network. Instead of the common network which connects the computers, these computers may be connected one-to-one by a cable to exchange data. The modules of the page management unit 114, the RIP processing units 122 and 152, and the like are realized when programs which describe the functions of these modules are executed on the computers. These programs are introduced to these computers through a portable computer-readable recording medium or a data communication network and installed.

Next, an example of activation control of the auxiliary unit 150 which is performed by the page management unit 114 of the system of FIG. 1 will be described with reference to FIG. 2.

On the premise of this control, the page management unit 114 monitors the load state of each RIP processing unit 122 (and when activated, the RIP processing unit 152) regularly, and obtains a load evaluation value representing the degree of load of each RIP processing unit.

As the load evaluation value of the RIP processing unit 122, for example, the number of unprocessed pages of the RIP processing unit 122 is used. That is, the RIP processing unit 122 has a queue of pages allocated from the front-end unit 110, extracts the first page from the queue each time the RIP processing of one page ends, and performs the RIP processing. The number of pages in the queue is the number of unprocessed pages. When the number of unprocessed pages is large, this means that the processing of the allocated pages does not proceed, and the load of the RIP processing unit 122 is high as much. In this example, the page management unit 114 receives the number of unprocessed pages in the queue from each of the RIP processing units 122C to 122K (and the RIP processing unit 152 of the auxiliary unit 150 in operation) regularly, and sets the number of unprocessed pages as a load evaluation value.

The load evaluation value of the RIP processing unit 122 may be obtained on the basis of the load of the CPU (for example, the usage of the CPU) which is executing the program of the RIP processing unit 122. The higher the load of the CPU, the greater the load evaluation value.

When processing page-independent print data, the load evaluation value of the RIP processing unit 122 may be obtained on the basis of the residual capacity of a buffer which stores a queue of pages allocated to the RIP processing unit 122. (Strictly, although this does not happen) there is a general tendency that as the amount of print data is large, a lot of time is spent for the RIP processing. Accordingly, when the free space of the buffer is small, this means that the data amount to be processed in the RIP processing unit 122 is large, and similarly to a case where the number of unprocessed pages is large, means that the load of the RIP processing unit 122 is high. The smaller the free space of the buffer, the greater the load evaluation value.

The number of unprocessed pages, the CPU load, and the buffer free space are just an example of information which obtains a load evaluation value. A load evaluation value may be obtained using additional information representing the situation of the RIP processing unit 122. Two or more of the number of unprocessed pages, the CPU load, and the buffer free space may be evaluated together to obtain a load evaluation value.

In various examples described in this specification, a load evaluation value has a positive value, and the greater the evaluation value, the higher the load. However, this is just an example, and alternatively, for example, a load evaluation value which decreases as the load of the RIP processing unit 122 or 152 increases may be used. Even when any load evaluation value is used, in the following description, when "a load evaluation value exceeds a threshold value", this means that the load of the RIP processing unit 122 or 152 is higher than the load corresponding to the threshold value (that is, the processing burden is heavier), instead of that the numerical value of the load evaluation value exceeds a threshold value.

Although in the above example, a load evaluation value is obtained from the current value of a numerical value of information for determination, such as the number of unprocessed pages, a load evaluation value may be calculated taking into consideration a trend (a trend of rise or fall) of the numerical value during a given period immediately. In this case, even if the numerical value of information for determination is identical, when the numerical value tends to rise during a prescribed period immediately from the present time, a load evaluation value is greater than a case where the numerical value tends to fall. Even if the numerical value is identical, the higher the rise rate, the greater the load evaluation value. Similarly, the higher a fall rate (that is, the greater the absolute value of the fall rate), the smaller the load evaluation value.

It may be said that the load evaluation value of the RIP processing unit 122 at a certain time represents a rough time (predicted value) necessary until the RIP processing of the page is completed when a new page is allocated to the RIP processing unit 122 at that time.

As described above, under the condition that the load evaluation value of each RIP processing unit 122 is obtained regularly, the page management unit 114 executes the procedure of FIG. 2 regularly. In this procedure, the page management unit 114 acquires the latest load evaluation value of each RIP processing unit 122 (S12). The acquired load evaluation value of each RIP processing unit 122 is compared with a prescribed on threshold value (S14), and if the load evaluation value of at least one RIP processing unit 122 exceeds the on threshold value, one of the auxiliary units 150 which are not yet powered on is selected and powered on (S16). The on threshold value is a threshold value which becomes the determination standard for activating the auxiliary unit 150, and set in advance. Power-on may be performed by an existing technique for controlling the on/off of the power supply through a network, such as WoL (Wake on LAN). For this end, in the front-end unit 110 (page management unit 114), address information (for example, MAC address or IP address) and the like of each auxiliary unit 150 are configured in advance.

With this power-on operation, the target auxiliary unit 150 is powered on, and the activation processing of the auxiliary unit 150 is executed. If the activation processing is completed and the auxiliary unit 150 is synchronized with other units 110 and 122, the auxiliary unit 150 participates in the print data processing system 100 (S18). In the participating auxiliary unit 150, page allocation is performed.

If the determination result in S14 is No, that is, if the load evaluation values of all the RIP processing units 122 are equal to or smaller than the on threshold value, S16 and S18 are not executed, and the process ends.

With this processing, each time the loads of the RIP units 120 and 152 in operation exceed the on threshold value, the unactivated auxiliary unit 150 is activated and participates in the system.

After the auxiliary unit 150 participates in the system, the page management unit 114 may obtain the load evaluation value of the participating auxiliary unit 150, and may compare the on threshold value at the time of the determination in S14 for the RIP processing unit 152 of the participating auxiliary unit 150.

Although in the above example, in S14, when the load evaluation value of at least one RIP processing unit 122 exceeds the on threshold value, the auxiliary unit 150 is powered on, this is just an example. For example, when the load evaluation values of all the RIP processing units 122 and 152 which participate in the system exceed the on threshold value, the unactivated auxiliary unit 150 may be powered on for the first time.

Next, an example of a page allocation processing of the RIP processing units 122 and 152 participating in the system by the page management unit 114 will be described with reference to FIG. 3.

The page management unit 114 determines whether or not there are unallocated pages in the course of allocating the pages of print data received from the host 300 sequentially from the first page (S22), and if there are unallocated pages, the process progresses to S24. In S24, the load evaluation values of the RIP processing units 122 and 152 participating in the system are acquired (S24), and the first page of the unallocated pages is allocated to the RIP processing unit 122 or 152 with the minimum value (that is, the lowest load) (S26). If a page is allocated to the RIP processing unit with the minimum load evaluation value, it is expected that the RIP processing result (bitmap image) of the page is obtained most quickly. In S22, if there are no unallocated pages, since it may be said that there are no pages to be printed, the process ends.

Figure 3:
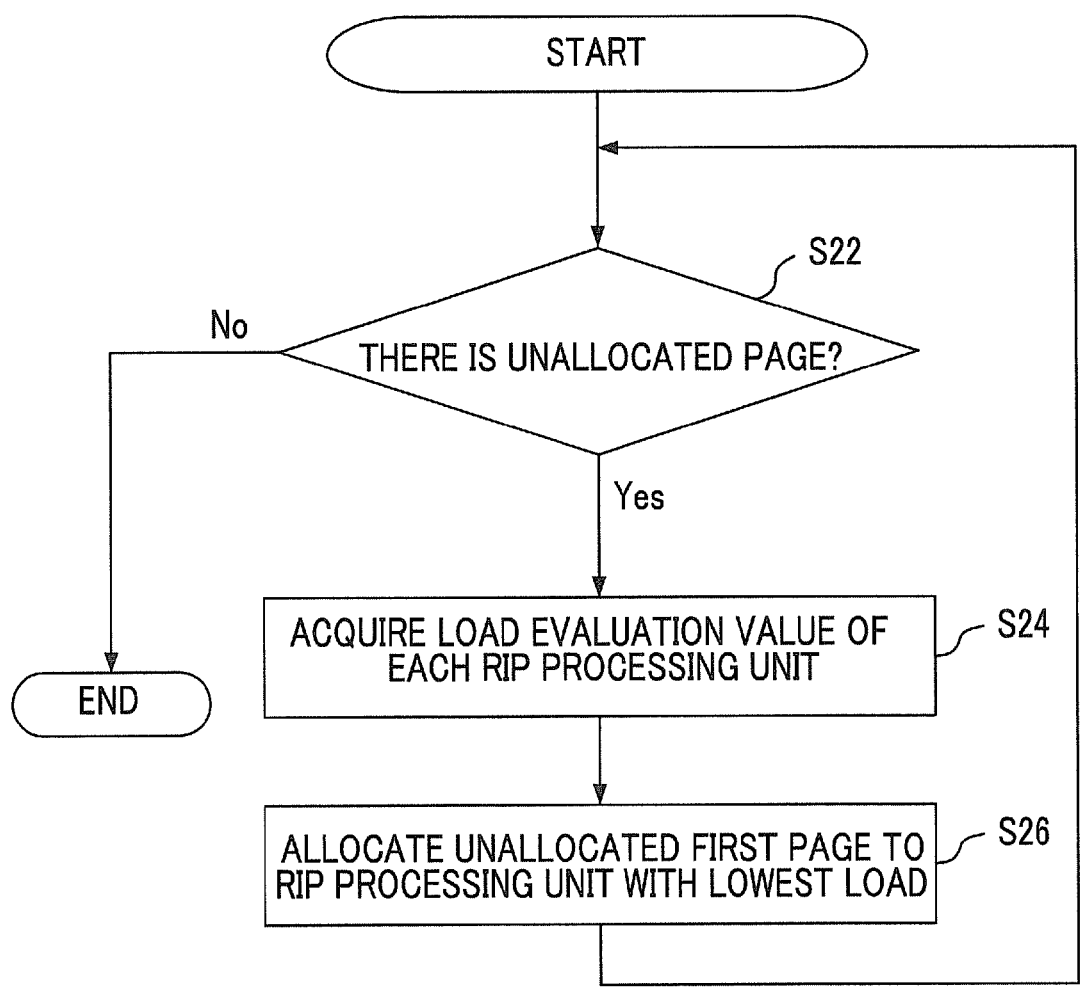
FIG. 3 is a diagram showing an example of a procedure of page allocation to each RIP processing unit in the example of FIG. 1.

The procedure of page allocation shown in FIG. 3 is just an example, a page allocation method which has been heretofore known or a page allocation method which will be hereafter developed may be used.

Next, a second example of the system of this exemplary embodiment will be described. FIG. 4 is a diagram showing a configuration example of a print data processing system 100 of the second example.

While in the first example shown in FIG. 1, the page management unit 114 in the front-end unit 110 performs controls for power-on of the auxiliary units 150, in the second example shown in FIG. 4, processing controllers 128C to 128K in RIP units 120 for respective color versions perform control for power-on of auxiliary units 150. A page management unit 114*a* of the second example is the same as the page management unit 114 of the first example, except that control for power-on of the auxiliary units 150 is not performed.

In this example, the auxiliary unit 150 which is activated from the individual RIP unit 120 is allocated with a page from the RIP unit 120 which issues an activation instruction, and returns a bitmap image of the RIP result to the RIP unit 120. That is, the activated auxiliary unit 150 is dedicated to the RIP unit 120 which issues an activation instruction. An auxiliary unit 150 in operation which is dedicated to a certain RIP unit 120 is referred to as "a corresponding auxiliary unit" of the RIP unit 120.

Figure 5:
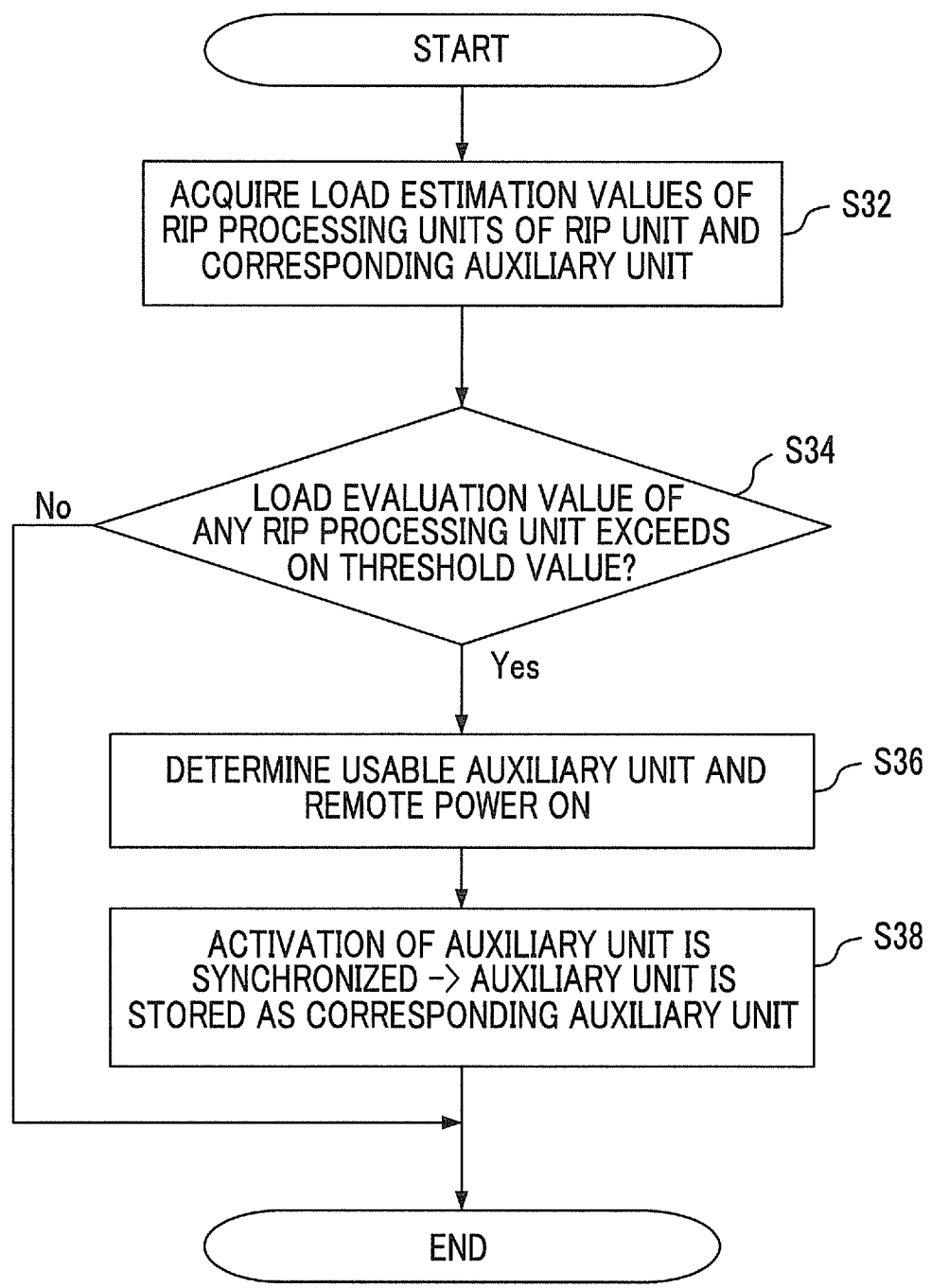
FIG. 5 is a diagram showing an example of a procedure of control for power-on of an auxiliary unit in the example of FIG. 4.

FIG. 5 shows an example of a processing procedure which is executed by the processing controllers 128C to 128K in the RIP units 120 for the respective color versions. In this procedure, the processing controller 128 acquires the load evaluation value of the RIP processing unit 122 of the RIP unit 120 to which the processing controller 128 belongs (S32). When there are already one or more corresponding auxiliary units 150 which assist the RIP unit 120, in S32, the load evaluation value of the RIP processing unit 152 of each corresponding auxiliary unit 150 is also acquired. The load evaluation values of the RIP unit 120 and the corresponding auxiliary units 150 are compared with the on threshold value (S34), and when at least one of the load evaluation values exceeds the on threshold value, the processing controller 128 selects and powers on one of the unactivated auxiliary units 150 (S36). To this end, in the processing controller 128, address information (for example, MAC address or IP address) and the like of each auxiliary unit 150 are configured in advance.

With this power-on operation, the target auxiliary unit 150 is powered on, and the activation processing of the auxiliary unit 150 is executed. If the activation processing is completed and the auxiliary unit 150 is synchronized with other units 110 and 122, the auxiliary unit 150 participates in the print data processing system 100, and the auxiliary unit 150 is stored as a corresponding auxiliary unit 150 (S38). Subsequently, the processing controller 128 reallocates some of the pages, which are allocated to the RIP processing unit 122 of the RIP unit from the front-end unit 110, to the corresponding auxiliary unit 150. If the determination result in S34 is No, that is, if the load evaluation values of all of the RIP processing unit 122 of the RIP unit and the RIP processing unit 152 of the corresponding auxiliary unit 150 are equal to or smaller than the on threshold value, S36 and S38 are not executed, and the process ends.

Although in the above example, in S34, the load evaluation value of at least one of the RIP processing unit 122 of the RIP unit and the RIP processing unit 152 of the corresponding auxiliary unit 150 exceeds the on threshold value, the auxiliary unit 150 is powered on, this is just an example. For example, when all the load evaluation values of the RIP processing unit 122 of the RIP unit and the RIP processing unit 152 of the corresponding auxiliary unit 150 exceed the on threshold value, the unactivated auxiliary units 150 may be powered on.

Next, an example of page allocation processing to the RIP processing unit 122 of the RIP unit 120 and the RIP processing unit 152 of the corresponding auxiliary unit 150 by the processing controller 128 will be described with reference to FIG. 6.

The processing controller 128 acquires the load evaluation values of the RIP processing unit 122 of the RIP unit 120 and the RIP processing unit 152 of each corresponding auxiliary unit 150 (S44) each time a page is allocated to the RIP unit 120 from the front-end unit 110 (the determination result in S42 is YES), and allocates the page to the RIP processing unit 122 or 152 with the minimum value (that is, the lowest load) (S46). The above processing is repeated up to the last page of print data.

Figure 6:
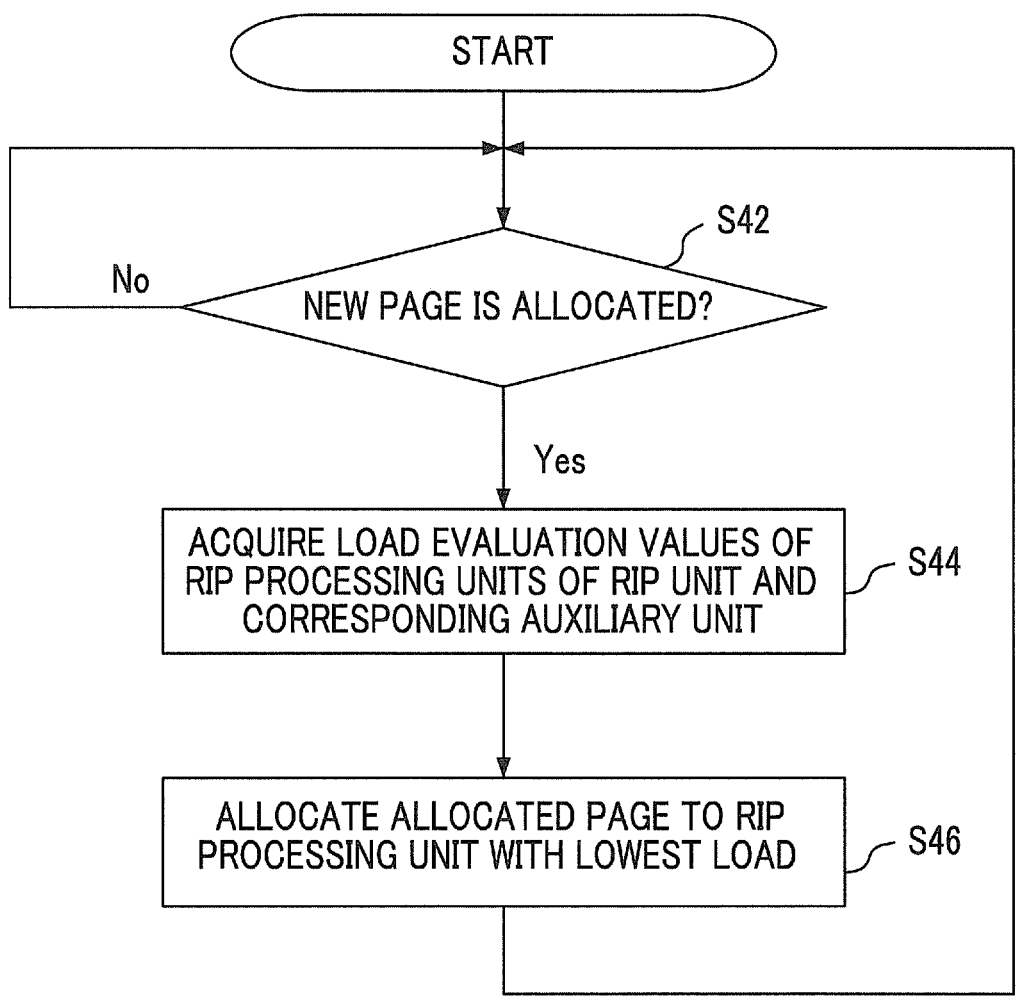
FIG. 6 is a diagram showing an example of a procedure of page reallocation by a processing controller in the example of FIG. 4.

The procedure of page allocation shown in FIG. 6 is just an example, and a page allocation method which has been heretofore known or a page allocation method which will be hereafter developed may be used.

The RIP processing unit 152 of the corresponding auxiliary unit 150 which is allocated with a page from the processing controller 128 of a certain RIP unit 120 returns the bitmap image of the RIP result to the RIP unit 120 as an allocation source if the RIP of the page is completed. The RIP unit 120 as an allocation source divides the bitmap image for the respective color versions, and transfers the bitmap image of each color version to the data storage unit 124 for the corresponding color version.

The RIP processing unit 152 of the corresponding auxiliary unit 150 may transfer the bitmap image of each color version directly to the data storage unit 124 for the corresponding color version instead of returning the bitmap image of the RIP result to the RIP unit 120 as an allocation source.

Next, a first modification of the foregoing exemplary embodiment will be described. Although in the foregoing exemplary embodiment, if the loads of the RIP processing units 122 and 152 are excess, the unactivated auxiliary unit 150 is automatically activated, in the first modification, when the activated auxiliary unit 150 is not necessary, that is, even if one of the auxiliary units 150 being activated is inactivated, when the RIP processing speed corresponding to the printing speed of the printer engine 200 is attained using the remaining RIP units 120 (and the auxiliary units 150), control for automatically powering off the auxiliary unit 150 is performed.

First, control of the first modification in the system configuration of FIG. 1 in which the front-end unit 110 performs power control for the auxiliary unit 150 will be described with reference to FIG. 7.

FIG. 7 shows an example of a control procedure by the page management unit 114 of FIG. 1 in this example. The page management unit 114 executes the procedure of FIG. 7 regularly.

In the procedure of FIG. 7, the page management unit 114 acquires the latest load evaluation values of the RIP processing unit 122 of each RIP unit 120 connected to the printer engine 200 and the RIP processing unit 152 of each auxiliary unit 150 which is powered on (S52). The page management unit 114 determines whether or not at least one of the auxiliary units 150 in the print data processing system 100 is participating in the system (that is, powered on) (S54). When there is no auxiliary unit 150 which is powered on, the page management unit 114 progresses the process to S14 of FIG. 2, and subsequently executes the processing procedure of FIG. 2.

When it is determined in S54 that one or more auxiliary units 150 are being activated, the load evaluation values of the RIP processing unit 122 of each RIP unit 120 as a main unit and the RIP processing unit 152 of each auxiliary unit 150 participating in the system acquired in S52 are compared with an off threshold value (S56). The off threshold value is a threshold value which becomes the determination standard for powering off the auxiliary unit 150 being activated, and is set in advance as a value such that, even if one of the auxiliary units 150 being activated is inactivated, the RIP processing speed corresponding to the printing speed of the printer engine 200 is attained using the remaining RIP units 120 (and the auxiliary units 150). The off threshold value may be set to a value smaller than the on threshold value. For example, even if the determination in S56 is established (Yes) and the one of the auxiliary units 150 in operation is powered off, the off threshold value such that the load evaluation values of the remaining RIP processing units 122 and 152 in operation (which share the load of the powered-off auxiliary unit 150) do not reach the on threshold value may be set by an experiment, a simulation, or the like. A value smaller than the threshold value set under this condition may be set as the off threshold value, such that the auxiliary unit 150 which is activated once is hard to be powered off, thereby suppressing a situation in which the auxiliary unit 150 is frequently powered on and off. A certain amount of time is spent until the auxiliary unit 150 participates in the system after having been powered on, and more power than normal operation is necessary for the activation processing of the auxiliary unit 150. Accordingly, it is advantageous that the auxiliary unit 150 is not frequently powered on and off.

If the determination result in S56 is No, that is, if the load evaluation value of at least one of the RIP processing units 122 and 152 is equal to or greater than the off threshold value, the page management unit 114 progresses the process to S14 of FIG. 2, and subsequently executes the processing procedure of FIG. 2.

If the determination result in S56 is Yes, that is, if the load evaluation values of all of the RIP processing units 122 and 152 fall below the off threshold value, the page management unit 114 selects one of the auxiliary units 150 participating in the system as a deletion target (S58). Since there is a case where unprocessed pages remain in the queue of the RIP processing unit 152 of the auxiliary unit 150 selected as a deletion target, after S58, the page management unit 114 does not allocate a new page to the deletion-target auxiliary unit 150, and waits until the RIP processing of the unprocessed pages in the queue is completed (S60). If the queue of the deletion-target auxiliary unit 150 is empty, and the RIP processing in the auxiliary unit 150 is completed, the page management unit 114 powers off the deletion-target auxiliary unit 150 (S62). The power-off operation may be performed using an existing technique, such as a remote control technique, such as a remote shell.

Next, processing when control of the first modification is applied to the system configuration of FIG. 4 in which each RIP unit 120 performs power control of the auxiliary unit 150 will be described with reference to FIG. 8.

FIG. 8 shows an example of a control procedure by the processing controller 128 of each RIP unit 120 of FIG. 4 in this example. The processing controller 128 executes the procedure of FIG. 8 regularly.

In the procedure of FIG. 8, the processing controller 128 acquires the latest load evaluation values of the RIP processing unit 122 of the RIP unit 120 and the RIP processing unit 152 of each corresponding auxiliary unit 150 (S72). The processing controller 128 determines whether or not there are corresponding auxiliary units 150 (that is, auxiliary units 150 being activated for assisting the RIP unit) (S74). If not, the processing controller 128 progresses the process to S34 of FIG. 5, and subsequently executes the processing procedure of FIG. 5.

When it is determined in S74 that there are corresponding auxiliary units 150, the processing controller 128 compares the load evaluation values of the RIP processing unit 122 of the RIP unit 120 and the RIP processing unit 152 of each corresponding auxiliary unit 150 acquired in S72 with the off threshold value (S76). The off threshold value is a threshold value which becomes the determination standard for powering off the corresponding auxiliary units 150, and is set in advance as a value such that, even if one of the corresponding auxiliary units 150 is inactivated, the RIP processing speed corresponding to the printing speed of the printer engine 200 is attained using the RIP unit 120 (and the remaining corresponding auxiliary units 150). The off threshold value may be set to a value smaller than the on threshold value. For example, an off threshold value such that, even if the determination in S76 is established (Yes) and the one of the corresponding auxiliary units 150 being activated is powered off, the load evaluation values of the RIP processing unit 122 of the RIP unit 120 and the RIP processing units 152 of the remaining corresponding auxiliary units 150 do not reach the on threshold value may be set in advance by an experiment, a simulation, or the like. A value smaller than the threshold value set under this condition may be set as the off threshold value, such that the auxiliary unit 150 which is activated once is hard to be powered off, thereby suppressing a situation in which the auxiliary unit 150 is frequently powered on and off.

If the determination result in S76 is No, that is, if the load evaluation value of at least one of the RIP processing unit 122 of the RIP unit 120 and the RIP processing units 152 of the corresponding auxiliary units 150 is equal to or greater than the off threshold value, the processing controller 128 progresses the process to S34 of FIG. 5, and subsequently executes the processing procedure of FIG. 5.

If the determination in S76 is Yes, that is, if the load evaluation values of all of the RIP processing unit 122 of the RIP unit 120 and the RIP processing units 152 of the corresponding auxiliary units 150 fall below the off threshold value, the processing controller 128 selects one of the corresponding auxiliary units 150 as a deletion target (S78). Since there is a case where unprocessed pages remain in the queue of the RIP processing unit 152 of the auxiliary unit 150 selected as a deletion target, after S78, the processing controller 128 does not allocate a new page to the deletion-target auxiliary unit 150, and waits until the RIP processing of the unprocessed pages in the queue is completed (S80). If the queue of the deletion-target auxiliary unit 150 is empty, and the RIP processing in the auxiliary unit 150 is completed, the processing controller 128 powers off the deletion-target auxiliary unit 150 (S82).

Next, a second modification of the foregoing exemplary embodiment will be described. Although in the foregoing exemplary embodiment, the load evaluation values of the RIP processing units 122 and 152 are used as the determination standard when activating the unactivated auxiliary units 150, in the second modification, in addition to the load evaluation values, the amount (hereinafter, referred to as "residual amount) of a portion of print data not yet allocated to the RIP unit 120 or the auxiliary unit 150 is also used as the determination standard. In the following example, a case where the number of unallocated pages (hereinafter, referred to as "the number of remaining pages") of print data is used as the residual amount will be described. However, for example, the data amount (for example, in bytes) of an unallocated portion of print data may be used for determination instead of the number of remaining pages.

As described above, a certain amount of time is spent until the auxiliary unit 150 participates in the system after having been powered on. If print data is completely processed before the auxiliary unit 150 participates in the system after having been powered on, the activation of the auxiliary unit 150 is meaningless. Accordingly, in the second modification, in order to prevent wasteful activation, the residual amount (in one example, the number of remaining pages) of print data is taken into consideration. That is, at least control is performed such that allocation of all pages of print data is not completed until the powered-on auxiliary unit 150 participates in the system.

First, control of the second modification in the system configuration of FIG. 1 in which the front-end unit 110 performs power control of the auxiliary unit 150 will be described with reference to FIG. 9.

FIG. 9 shows an example of a control procedure by the page management unit 114 of FIG. 1 in this example. The page management unit 114 executes the procedure of FIG. 9 regularly.

In this procedure, the page management unit 114 acquires the latest load evaluation values of the RIP processing units 122 and 152 and the number of remaining pages of print data (S92). The number of remaining pages may be obtained by subtracting the number of pages already allocated to the RIP processing units 122 and 152 from the number of total pages of print data. The acquired load evaluation value of each RIP processing unit 122 is compared with a prescribed on threshold value, and the number of remaining pages is compared with a page count threshold value (S94)

The page count threshold value is a threshold value of the number of remaining pages. For example, the page count threshold value may be set on the basis of the average number of pages printed by the printer engine 200 for an average necessary time required until the auxiliary unit 150 participates in the system after having been powered on. The average number of pages is regarded as to be substantially the same as the number of pages subjected to the RIP processing by the print data processing system 100 for the average necessary time. Accordingly, for example, if the average number of pages itself is set as a page count threshold value, and a necessary condition for power-on of the auxiliary unit 150 is that the number of remaining pages of print data is equal to or greater than the page count threshold value, it is possible to suppress at least a situation in which the processing of print data ends while the activated auxiliary unit 150 is not used at all. Actually, since, if the activated auxiliary unit 150 is not used for a certain number of pages, the activated auxiliary unit 150 does not correspond to the amount of power necessary for the activation processing of the auxiliary unit 150, the page count threshold value is set taking into consideration the amount of power necessary for the activation processing.

In S94, it is determined whether or not both of the condition that the load evaluation value of at least one RIP processing unit 122 exceeds the on threshold value (or all the load evaluation values of the RIP processing units 122 and 152 being activated exceed the on threshold value) and the condition that the number of remaining pages of print data exceeds the page count threshold value are satisfied. When both are satisfied, the page management unit 114 selects and powers on one of the unactivated auxiliary units 150 (S96). With this power-on operation, the target auxiliary unit 150 is powered on, and the activation processing of the auxiliary unit 150 is executed. If the activation processing is completed, and the auxiliary unit 150 is synchronized with other units 110 and 122, the auxiliary unit 150 participates in the print data processing system 100 (S98).

If the determination result in S94 is No, that is, if at least one of the above-described two conditions is not satisfied, S96 and S98 are not executed, and the process ends.

Next, processing when control of the second modification is applied to the system configuration of FIG. 4 in which each RIP unit 120 performs power control of the auxiliary unit 150 will be described with reference to FIG. 10.

In this procedure, the processing controller 128 of each RIP unit 120 acquires the latest load evaluation values of the RIP processing unit 122 of the RIP unit 120 and the RIP processing units 152 of the corresponding auxiliary units 150 (if there are corresponding auxiliary units 150), and the number of remaining pages of print data (S102). The acquired load evaluation values of the RIP processing units 122 and 152 are compared with the prescribed on threshold value, and the number of remaining pages is compared with the page count threshold value (S104).

In S104, it is determined whether or not both of the condition that the load evaluation value of at least one of the RIP processing unit 122 of the RIP unit 120 and the RIP processing units 152 of the corresponding auxiliary units 150 exceeds the on threshold value (or in another example, all the load evaluation values exceed the on threshold value) and the condition that the number of remaining pages of print data exceeds the page count threshold value are satisfied. When both are satisfied, the processing controller 128 selects and powers on one of the unactivated auxiliary units 150 (S106). With this power-on operation, the target auxiliary unit 150 is powered on, and the activation processing of the auxiliary unit 150 is executed. If the activation processing is completed, and the auxiliary unit 150 is synchronized with other units 110 and 122, the auxiliary unit 150 participates in the print data processing system 100, and the auxiliary unit 150 is stored as a corresponding auxiliary unit 150 (S108). Subsequently, the processing controller 128 reallocates some of the pages, which are allocated to the RIP processing unit 122 of the RIP unit from the front-end unit 110, to the corresponding auxiliary unit 150.

If the determination result in S104 is No, that is, if at least one of the above-described two conditions is not satisfied, S106 and S108 are not executed, and the process ends.

Next, a third modification of the foregoing exemplary embodiment will be described. In the foregoing first modification, when the load evaluation value of the RIP processing unit 122 or 152 being activated falls below the off threshold value, one of the auxiliary units 150 being activated is powered off. In contrast, in the third modification, in addition to the load evaluation value, it is determined whether or not to power off the auxiliary unit 150 taking into consideration of the "residual amount" of print data.

As described above, when activating the auxiliary unit 150, a large amount of power is consumed compared to normal operation of the auxiliary unit 150. For this reason, if the auxiliary unit 150 which has been activated once is powered off and activated again later, the amount of waster of power consumption is large. Accordingly, in the third modification, in order to prevent power-off in a state where reactivation is possible, the residual amount (in one example, the number of remaining pages) of print data is taken into consideration. That is, the auxiliary unit 150 is prevented from being not powered off until the residual amount of print data is sufficient small such that the auxiliary unit 150 which is powered off once is not reactivated.

First, control of the third modification in the system configuration of FIG. 1 in which the front-end unit 110 performs power control of the auxiliary unit 150 will be described with reference to FIG. 11.

FIG. 11 shows an example of a control procedure by the page management unit 114 of FIG. 1 in this example. The page management unit 114 executes the procedure of FIG. 11 regularly.

In the procedure of FIG. 11, the page management unit 114 acquires the latest load evaluation values of the RIP processing units 122 and 152 and the number of remaining pages of print data (S112). The page management unit 114 determines whether or not at least one of the auxiliary units 150 in the print data processing system 100 is participating in the system (S114). When there is no auxiliary unit 150 which is powered on, the page management unit 114 progresses the process to S94 of FIG. 9, and subsequently executes the processing procedure of FIG. 9.

When it is determined in S114 that one or more auxiliary units 150 are being activated, the load evaluation value of each RIP processing unit 122 acquired in S112 is compared with the prescribed on threshold value, and the number of remaining pages is compared with the page count threshold value (S116). In S116, it is determined whether or not both of the condition that the load evaluation values of all of the RIP processing units 122 and 152 being activated fall below the off threshold value and the condition that the number of remaining pages of print data is equal to or smaller than the page count threshold value are satisfied. The page count threshold value used herein may be equal to or different from the page count threshold value used in S94 of the procedure of FIG. 9. When both are the same, if the condition that the number of remaining pages of print data is equal to or smaller than the page count threshold value is satisfied and the auxiliary unit 150 is powered off, there is no case where the powered-off auxiliary unit 150 is activated again by the procedure of FIG. 9.

With the determination in S116, when both the above-described two conditions are satisfied, the page management unit 114 selects one of the auxiliary units 150 participating in the system as a deletion target (S118). A new page is not allocated to the auxiliary unit 150 selected as a deletion target, and it waits until the RIP processing of the unprocessed pages in the queue is completed (S120). If the queue of the deletion-target auxiliary unit 150 is empty, and the RIP processing in the auxiliary unit 150 is completed, the page management unit 114 powers off the deletion-target auxiliary unit 150 (S122).

If the determination result in S116 is No, that is, if at least one of the above-described two conditions is not satisfied, the page management unit 114 progresses the process to S94 of FIG. 9, and subsequently executes the processing procedure of FIG. 9.

Next, processing when control of the third modification is applied to the system configuration of FIG. 4 in which each RIP unit 120 performs power control of the auxiliary unit 150 will be described with reference to FIG. 12.

In this procedure, the processing controller 128 of each RIP unit 120 acquires the latest load evaluation values of the RIP processing unit 122 of the RIP unit 120 and the RIP processing units 152 of the corresponding auxiliary units 150 (if there are corresponding auxiliary units 150), and the number of remaining pages of print data (S132). The processing controller 128 determines whether or not there are corresponding auxiliary units 150 (S134). If not, the processing controller 128 progresses the process to S104 of FIG. 10, and subsequently executes the processing procedure of FIG. 10.

When it is determined in S134 that there are corresponding auxiliary units 150, the load evaluation values of the RIP processing units 122 and 152 acquired in S132 are compared with the prescribed off threshold value, and the number of remaining pages is compared with the page count threshold value (S136). The page count threshold value may be the same as the page count threshold value which is used in S114 of the Example of FIG. 11. In S136, it is determined whether or not both of the condition that all the load evaluation values of the RIP processing unit 122 of the RIP unit 120 and the RIP processing units 152 of the corresponding auxiliary units 150 fall below the off threshold value and the condition that the number of remaining pages of print data is equal to or smaller than the page count threshold value are satisfied.

With the determination in S136, when both the above-described two conditions are satisfied, the processing controller 128 selects one of the corresponding auxiliary units 150 participating in the system as a deletion target (S138). A new page is not allocated to the corresponding auxiliary unit 150 selected as a deletion target, and it waits until the RIP processing of the unprocessed pages in the queue is completed (S140). If the queue of the deletion-target corresponding auxiliary unit 150 is empty, and the RIP processing in the corresponding auxiliary unit 150 is completed, the processing controller 128 powers off the deletion-target corresponding auxiliary unit 150 (S142).

If the determination result in S136 is No, that is, if at least one of the above-described two conditions is not satisfied, the processing controller 128 progresses the process to S104 of FIG. 10, and subsequently executes the processing procedure of FIG. 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print data processing system comprising:
a plurality of main interpretation devices that interpret print data described in a page description language and generate print image data to be supplied to a printer;
auxiliary interpretation devices that interpret the print data, generate print image data to be supplied to the printer, and are not powered on when the plurality of main interpretation devices are powered on; and
an allocation device that divides the print data in prescribed units and allocates interpretation processing of divided print data of the respective units to the plurality of main interpretation devices,
wherein the allocation device includes
a load evaluation unit that evaluates the loads of the plurality of main interpretation devices, and
a power-on unit that, when the loads of the plurality of main interpretation devices evaluated by the load evaluation unit exceed a prescribed on threshold value, and an amount of a portion of the print data not allocated to the plurality of main interpretation devices exceeds a prescribed first residual amount threshold value, the power-on unit powers on the auxiliary interpretation devices, and
processing of divided print data of the respective units is allocated to the auxiliary interpretation devices after power-on,
wherein the first residual amount threshold value is a value on the basis of a number of pages processed by the main interpretation devices for a necessary time required until the auxiliary interpretation devices are available to process the print data after having been powered on.

2. The print data processing system according to claim 1, wherein the allocation device further comprises:
a power-off unit that, when the loads of the plurality of main interpretation devices evaluated by the load evaluation unit fall below a prescribed off threshold value for powering off the auxiliary interpretation devices which are powered on and in operation, powers off at least one of the auxiliary interpretation devices in operation.

3. The print data processing system according to claim 2, wherein, when the loads of the plurality of main interpretation devices evaluated by the load evaluation unit fall below the off threshold value, and the amount of a portion of the print data not allocated to the plurality of main interpretation devices falls below a prescribed second residual amount threshold value, the power-off unit powers off at least one of the auxiliary interpretation devices in operation.

* * * * *